United States Patent
Feng et al.

(10) Patent No.: US 8,299,746 B2
(45) Date of Patent: Oct. 30, 2012

(54) MOVE-SLED-HOME DEVICE AND METHOD FOR USE IN OPTICAL DISC DRIVE

(75) Inventors: Wen-Chun Feng, Taipei (TW); Yen-Chien Cheng, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 229 days.

(21) Appl. No.: 12/851,644

(22) Filed: Aug. 6, 2010

(65) Prior Publication Data
US 2011/0055857 A1 Mar. 3, 2011

(30) Foreign Application Priority Data
Aug. 31, 2009 (TW) .............................. 98129299 A

(51) Int. Cl.
*H02P 1/46* (2006.01)
(52) U.S. Cl. ................ 318/717; 318/400.04; 318/436; 318/650; 318/569; 360/77.02; 360/313; 360/31; 360/78.06; 369/116; 369/13.02; 369/275.3; 711/112
(58) Field of Classification Search .............. 318/400.04, 318/436, 717, 569, 650; 369/116, 13.02, 369/13.14, 13.17, 275.3, 30.17, 30.18, 44.11, 369/44.13, 44.26, 44.28, 44.29, 44.36, 47.36, 369/47.38, 53.1, 53.15, 53.2, 53.37, 53.38, 369/59.12, 228; 720/601, 610, 660, 663; 386/228, 334; 347/19, 225, 32; 360/31, 360/313, 67, 73.03, 77.02, 75, 78.04, 78.06; 363/98; 711/112
See application file for complete search history.

(56) References Cited

U.S. PATENT DOCUMENTS

| | | | | |
|---|---|---|---|---|
| 5,841,739 A | * | 11/1998 | Iida et al. | 369/30.13 |
| 6,614,614 B1 | * | 9/2003 | Murayama et al. | 360/77.02 |
| 2005/0276190 A1 | * | 12/2005 | Kamiya et al. | 369/53.2 |
| 2008/0080339 A1 | * | 4/2008 | Huang et al. | 369/44.29 |
| 2009/0147408 A1 | * | 6/2009 | Yamasaki | 360/313 |

FOREIGN PATENT DOCUMENTS
JP 05012786 A * 1/1993
* cited by examiner

*Primary Examiner* — Walter Benson
*Assistant Examiner* — Jorge Carrasquillo
(74) *Attorney, Agent, or Firm* — WPAT., P.C.; Justin King

(57) ABSTRACT

A move-sled-home device is used in an optical disc drive. The move-sled-home device includes a processing unit, a motor actuator, a sled, a sled motor, and a current-detecting unit. The processing unit outputs a control signal. The motor actuator generates a driving voltage according to the control signal. The sled motor generates a driving current according to the driving voltage to move the sled. The current-detecting unit is used for receiving and converting the driving current into an indicating signal, and issuing the indicating signal to the processing unit. During a move-sled-home action, the processing unit realizes a magnitude of the driving current according to the indicating signal, thereby determining whether the move-sled-home action is finished.

15 Claims, 5 Drawing Sheets

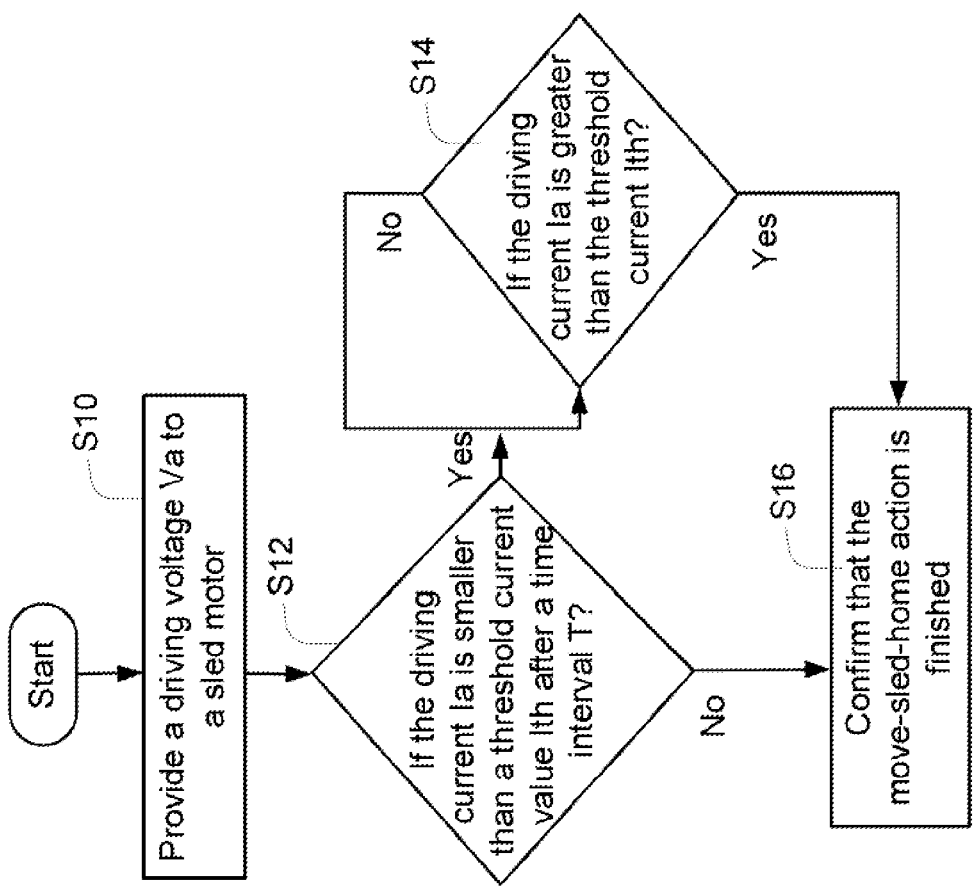
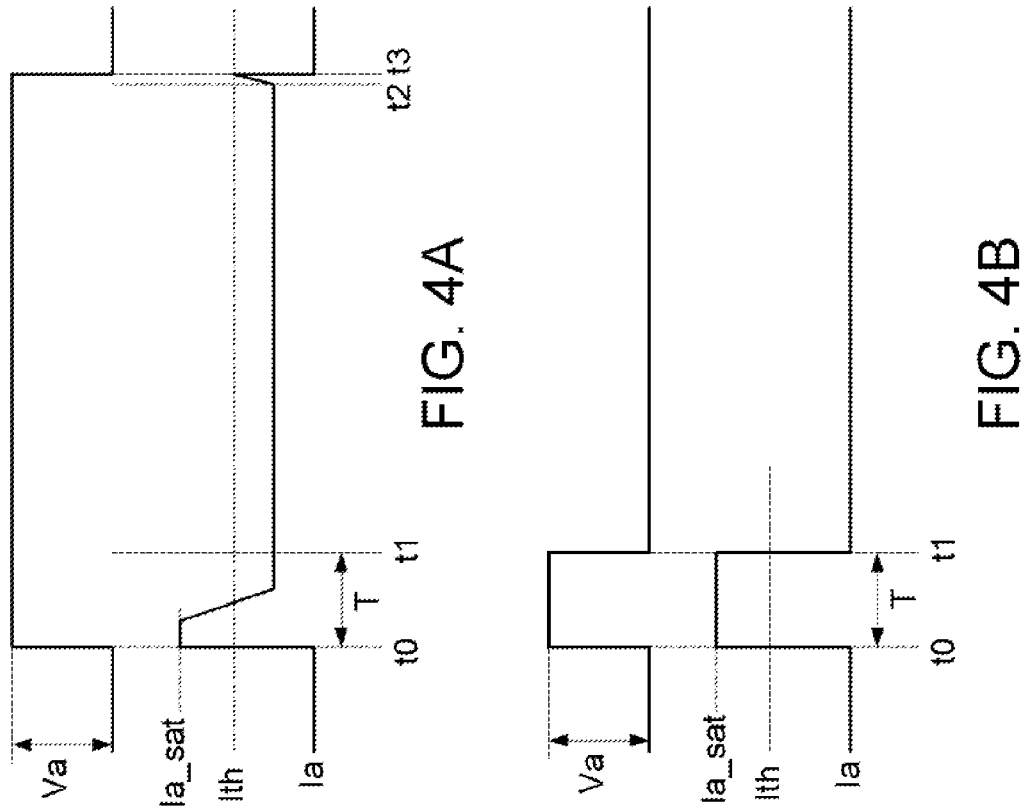

MOVE-SLED-HOME DEVICE AND METHOD FOR USE IN OPTICAL DISC DRIVE

FIELD OF THE INVENTION

The present invention relates to a controlling method and a controlling device for use in an optical disc drive, and more particularly to a move-sled-home device and a move-sled-home method for use in an optical disc drive.

BACKGROUND OF THE INVENTION

Generally, after an optical disc is loaded into the optical disc drive, a start-up procedure is executed. In the start-up procedure, the optical disc is rotated by the optical disc drive, and an optical pickup head of the optical disc drive emits laser light. The laser light is focused on a rotating optical disc, and the light reflected by the optical disc is detected to realize the type of the optical disc and associated controlling parameters. Generally, the common optical discs include read-only, write-once or rewritable compact discs (CDs), digital versatile discs (DVDs) or Blu-ray discs.

In addition, after the optical disc is loaded and before the start-up procedure, the optical disc drive needs to execute a process of stopping the spindle motor and an action of moving a sled to a home position (also referred as a move-sled-home action). After the rotation of the spindle motor is stopped and the sled is moved to the home position, the start-up procedure of the optical disc drive is executed.

FIG. 1A is a schematic view illustrating the internal configurations of a conventional optical disc drive. As shown in FIG. 1A, the optical disc drive comprises a spindle motor 20, a guiding rail 30, a sled 40, a limit switch 50, a spiral guiding rod 60 and a sled motor 70. In addition, an optical pickup head 42 is supported on the sled 40 for emitting laser light, which is focused on an optical disc (as indicated by a dotted line).

When the optical disc is loaded into the optical disc drive, the optical disc is disposed above the spindle motor 20 and driven to rotate by the spindle motor 20. Moreover, the spiral guiding rod 60 is rotated by the sled motor 70. The sled 40 is supported by the guiding rail 30 and the spiral guiding rod 60. By changing the rotating direction of the sled motor 70, the sled 40 is moved back and forth along the radial direction of the optical disc.

FIG. 1B is a schematic view illustrating a procedure of moving the sled to a home position by a conventional optical disc drive. As known, during the move-sled-home action, the sled 40 is driven by the sled motor 70 and moved toward the inner track of the optical disc. The position of the innermost track is also defined as a sled-home position. Until the sled 40 is moved to the innermost track of the optical disc, the limit switch 50 is touched and triggered by the sled 40. In other words, the optical disc drive could determine whether the sled 40 is moved to the sled-home position according to the status of the limit switch 50.

For most optical disc drives, the limit switch is usually omitted in order to reduce the fabricating cost. In a case that the limit switch is omitted, the optical disc drive cannot determine whether the sled is moved to the sled-home position according to the status of the limit switch.

For executing the move-sled-home action in the case that no limit switch is included in the optical disc drive, a constant voltage is transmitted to the sled motor within a sled-home duration when each move-sled-home action is executed. Since the optical disc drive fails to realize the actual position of the sled before the move-sled-home action starts, the constant voltage and the sled-home duration are set to allow the sled to be moved from the outermost track to the innermost track of the optical disc. Moreover, since no limit switch is included in the optical disc drive, the sled will be in contact with the spindle motor when the sled is moved to exceed the sled-home position.

However, when the move-sled-home action is executed by the optical disc drive, the sled is not always located at the outermost track of the optical disc. As such, the sled and the spindle motor usually collide with each other during the move-sled-home action. Even if the sled is very close to the innermost track of the optical disc before the move-sled-home action starts, the sled-home duration is fixed. That is, this conventional method is time-consuming. Since the constant voltage is continuously received by the sled motor after the spindle motor is collided by the sled, the spiral guiding rod and the sled are readily damaged.

Therefore, there is a need of providing a controlling method and a controlling device for moving a sled to a home position by an optical disc drive in order to obviate the drawbacks encountered from the prior art.

SUMMARY OF THE INVENTION

The present invention provides a move-sled-home device and a move-sled-home method for use in an optical disc drive without any limit switch, in which the driving current of the sled motor is detected to determine whether a move-sled-home action is finished, and the sled motor stops rotating immediately after the move-sled-home action is finished.

In accordance with an aspect of the present invention, there is provided a move-sled-home device for use in an optical disc drive. The move-sled-home device includes a processing unit, a motor actuator, a sled, a sled motor, and a current-detecting unit. The processing unit outputs a control signal. The motor actuator generates a driving voltage according to the control signal. The sled motor generates a driving current according to the driving voltage to move the sled. The current-detecting unit is used for receiving the driving current, converting the driving current into an indicating signal, and issuing the indicating signal to the processing unit. During a move-sled-home action, the processing unit realizes a magnitude of the driving current according to the indicating signal, thereby judging whether the move-sled-home action is finished.

In accordance with another aspect of the present invention, there is provided a move-sled-home device for use in an optical disc drive. The move-sled-home device includes a processing unit, a first actuating unit, a second actuating unit, a sled, a sled motor, a spindle motor and a current-detecting unit. The processing unit outputs a control signal and a selecting signal. The first actuating unit generates a first driving voltage according to the control signal. The second actuating unit generates a second driving voltage according to the control signal. The sled motor generates a sled motor driving current according to the first driving voltage to move the sled. The spindle motor generates a spindle motor driving current according to the second driving voltage. The current-detecting unit is used for selecting the sled motor driving current or the spindle motor driving current to be converted into an indicating signal according to the selecting signal, and issuing the indicating signal to the processing unit. During a move-sled-home action, the processing unit realizes a magnitude of the sled motor driving current according to the indicating signal, thereby judging whether the move-sled-home action is finished. When a spindle motor stopping process is executed by the processing unit, the processing unit realizes a magnitude of the spindle motor driving current according to the indicating signal, thereby judging whether the spindle motor stopping process is finished.

In accordance with a further aspect of the present invention, there is provided a move-sled-home method for use in an optical disc drive. Firstly, a driving voltage is provided to a sled motor, so that the sled motor generates a driving current to move a sled. Then, a move-sled-home action is executed for moving the sled to a sled-home position. Then, the move-sled-home method includes a step of judging whether the move-sled-home action is finished. If the driving current is not smaller than a threshold current value after the move-sled-home action has been executed for a specified time interval, it determined that the move-sled-home action is finished. Whereas, if the driving current is smaller than the threshold current value after the move-sled-home action has been executed for the specified time interval, the move-sled-home action is not finished until the driving current rises to be greater than the threshold current value.

BRIEF DESCRIPTION OF THE DRAWINGS

The above contents of the present invention will become more readily apparent to those ordinarily skilled in the art after reviewing the following detailed description and accompanying drawings, in which:

FIGS. 4A and 4B are schematic timing waveform diagrams illustrating associated signals processed by the move-sled-home device according to the first embodiment of the present invention;

FIG. 5 is a flowchart illustrating a move-sled-home method for moving a sled to a sled-home position as described in FIGS. 4A and 4B;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
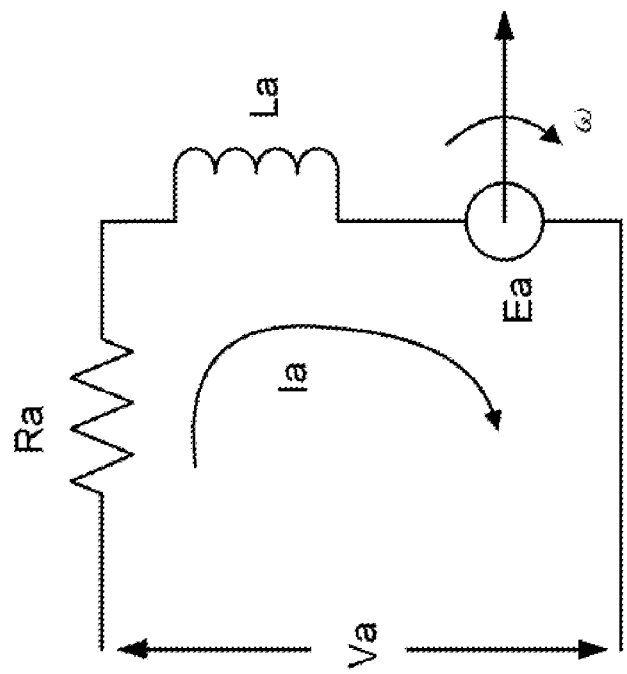
FIG. 2 is a schematic circuit diagram illustrating an equivalent circuit of a DC motor.

FIG. 2 is a schematic circuit diagram illustrating an equivalent circuit of a DC motor. In the equivalent circuit of the DC motor, Ra is an armature resistor, La is an armature inductance, Ea is a back emf, Ia is a driving current, Va is a driving voltage, and ω is an angular velocity. The driving voltage is determined by the following equation (1):

$$Va = Ra \cdot Ia + La \cdot \frac{dIa}{dt} + Ea \quad (1)$$

The above equation is transformed into an s domain, and the driving current is obtained as the following equation (2):

$$Ia = \frac{(Va - Ea)}{Ra + La \cdot s} \quad (2)$$

Wherein, Ea=Kb·ω, and Kb is a back-emf constant.

As can be deduced from the equation (2), if the DC motor stops rotating, the angular velocity is zero (ω=0), and thus the back emf is zero (Ea=0). In this situation, the driving current Ia rises to a saturated driving current Ia_sat. The saturated driving current Ia_sat is determined by the following equation (3):

$$Ia\_sat = \frac{Va}{Ra + La \cdot s} \quad (3)$$

Since the sled motor of the optical disc drive is a DC motor, the equation (3) can be used for judging whether the move-sled-home action is finished.

Figure 1A:
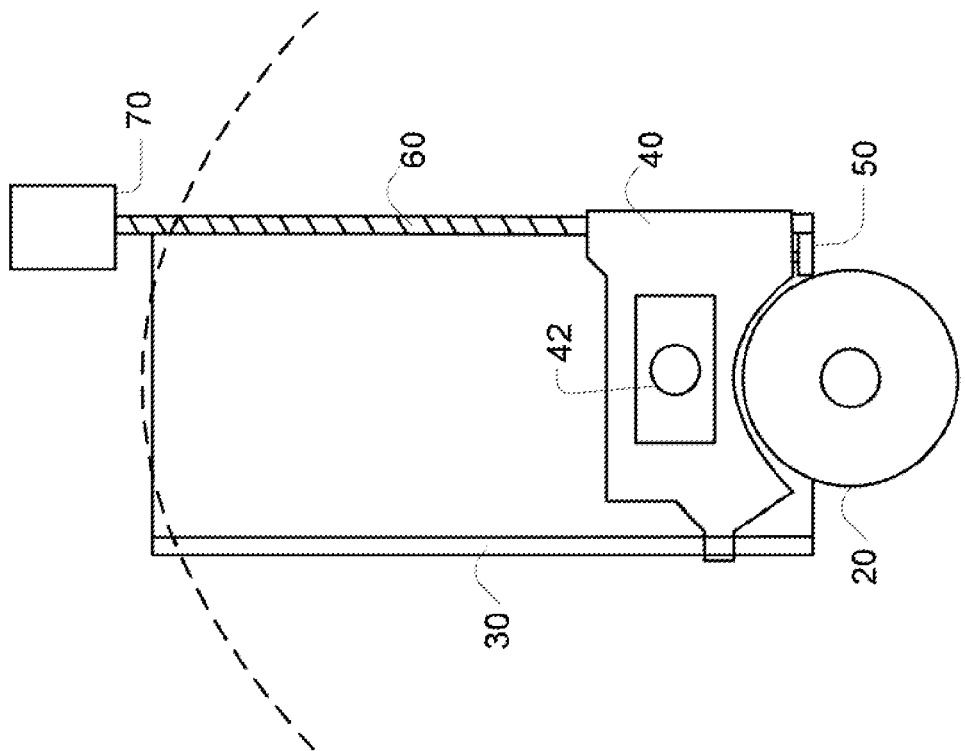
FIG. 1A is a schematic view illustrating the internal configurations of a conventional optical disc drive.
Figure 1B:
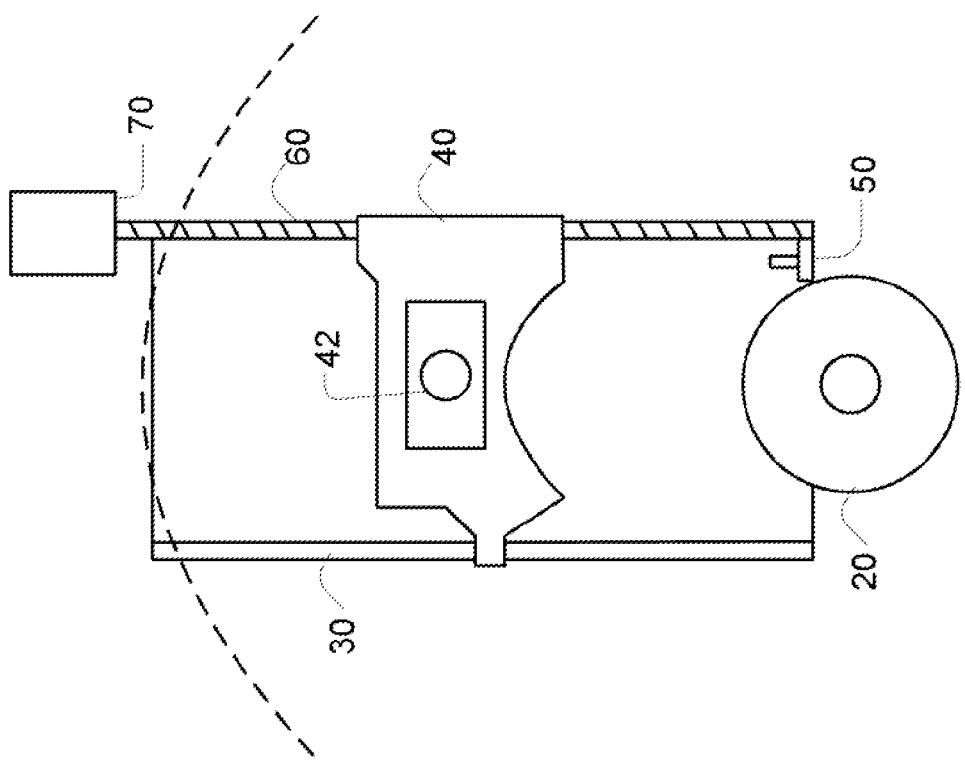
FIG. 1B is a schematic view illustrating a procedure of moving the sled to a home position by a conventional optical disc drive.
Figure 3:
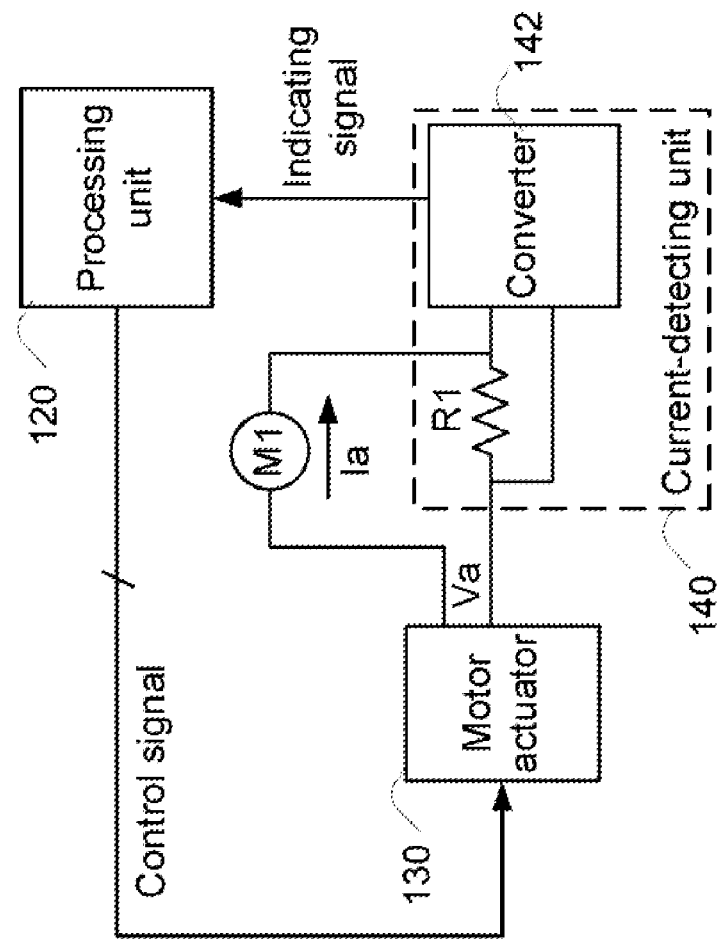
FIG. 3 is a schematic functional block diagram illustrating a move-sled-home device for moving a sled to a sled-home position according to a first embodiment of the present invention.

FIG. 3 is a schematic functional block diagram illustrating a move-sled-home device for moving a sled to a sled-home position according to a first embodiment of the present invention. As shown in FIG. 3, the move-sled-home device comprises a processing unit 120, a motor actuator 130, a sled motor M1 and a current-detecting unit 140. The current-detecting unit 140 comprises a detecting resistor R1 and a converter 142. An example of the processing unit 120 is a digital signal processor (DSP). In this embodiment, the converter 142 is an analog-to-digital converter (ADC).

Hereinafter, the operating principles of the move-sled-home device will be illustrated with reference to FIGS. 2 and 3. For executing the move-sled-home action, the processing unit 120 outputs a control signal to the motor actuator 130. According to the control signal, the motor actuator 130 outputs a driving voltage Va. According to the driving voltage Va, the sled motor M1 generates a driving current Ia. As such, the sled motor M1 rotates to move a sled along a guiding rail (not shown). Moreover, according to the driving current Ia, there is a voltage drop across the detecting resistor R1 of the current-detecting unit 140. By the converter 142, the analog detecting voltage (voltage drop across the detecting resistor R1) is converted into a digital indicating signal, which is transmitted to the processing unit 120.

Since the indicating signal is in proportion to the driving current Ia, the processing unit 120 is capable of realizing the magnitude of the driving current Ia according to the indicating signal. In addition, the sled will be in contact with the spindle motor when the sled is moved to the sled-home position. In this situation, the sled motor M1 will stop rotating, and the driving current Ia rises to a saturated driving current Ia_sat. In accordance with a key feature of the present invention, a threshold current value Ith is defined by the processing unit 120 in order to judge whether the move-sled-home action is finished.

In a case that the driving current Ia is smaller than the threshold current value Ith, the processing unit 120 determines that the move-sled-home action is not finished. Meanwhile, the control signal is continuously transmitted from the processing unit 120 to the motor actuator 130, so that the sled motor M1 continuously rotates. On the other hand, in a case that the driving current Ia rises to the threshold current value Ith, the processing unit 120 determines that the move-sled-home action is finished. Meanwhile, the processing unit 120 stops generating the control signal to the motor actuator 130, so that the sled motor M1 stops rotating.

FIGS. 4A and 4B are schematic timing waveform diagrams illustrating associated signals processed by the move-sled-home device according to the first embodiment of the present invention. Since the optical disc drive fails to realize the actual position of the sled before the move-sled-home action starts, the possible situations include that the sled is deviated from the innermost track of the optical disc (see FIG. 4A) or located above the innermost track of the optical disc (see FIG. 4B).

Please refer to FIG. 4A. At the time spot t0, the optical disc drive starts the move-sled-home action, and thus a driving voltage Va is outputted from the motor actuator 130. Although the driving voltage Va is received by the sled motor M1 at the time spot t0, the sled motor M1 does not instantly rotate because of the inherent static friction force of the sled motor M1. Meanwhile, the driving current Ia is equal to the saturated driving current Ia_sat.

After the static friction force of the sled motor M1 is overcome, the sled motor M1 starts to rotate, and thus the sled is moved toward the innermost track of the optical disc. Meanwhile, the driving current Ia gradually decreases. In accordance with the present invention, a specified time interval T is defined by the processing unit 120. After the specified time interval T (i.e. at the time spot t1), the current-detecting unit 140 starts to detect the driving current Ia.

From the time spot t1 to the time spot t2, the sled motor M1 continuously rotates. In this situation, the magnitude of the driving current Ia is smaller than the threshold current value Ith.

At the time spot t2, the sled is in contact with the spindle motor. As such, the sled is stopped, and the sled motor M1 fails to rotate. Meanwhile, the driving current Ia abruptly rises. At the time spot t3, the driving current Ia rises to the threshold current value Ith. In this situation, the processing unit 120 confirms that the move-sled-home action is finished, so that the processing unit 120 stops generating the control signal. Meanwhile, the driving voltage Va and the driving current Ia reach zero value.

Please refer to FIG. 4B. At the time spot t0, the optical disc drive starts the move-sled-home action, and thus a driving voltage Va is outputted from the motor actuator 130. In addition, at the time spot t0, the sled is located above the innermost track of the optical disc and in contact with the spindle motor. Although the driving voltage Va is received by the sled motor M1 at the time spot t0, the sled motor M1 does not rotate because the sled cannot be moved toward the spindle motor further. Meanwhile, the driving current Ia is equal to the saturated driving current Ia_sat.

After the specified time interval T (i.e. at the time spot t1), the processing unit 120 detects that the driving current Ia of the sled motor M1 is still greater than the threshold current value Ith. In this situation, the processing unit 120 confirms that the move-sled-home action is finished, so that the processing unit 120 stops generating the control signal. Meanwhile, the driving voltage Va and the driving current Ia reach zero.

FIG. 5 is a flowchart illustrating a move-sled-home method for moving a sled to a sled-home position as described in FIGS. 4A and 4B. First of all, in the step S10, the optical disc drive starts the move-sled-home action, and thus the processing unit 120 outputs a control signal to the motor actuator 130. According to the control signal, a driving voltage Va is outputted from the motor actuator 130.

After the specified time interval T, the driving current Ia of the sled motor M1 is realized by the processing unit 120 according to the indicating signal outputted from the current-detecting unit 140.

If the driving current Ia is greater than the threshold current value Ith defined by the processing unit 120 (step S12), the processing unit 120 confirms that the move-sled-home action is finished (step S16). Whereas, if the driving current Ia is smaller than the threshold current value Ith defined by the processing unit 120 (step S12), the processing unit 120 confirms that the sled motor continuously rotates and the processing unit 120 continuously detects the driving current Ia.

If the driving current Ia is continuously smaller than or equal to the threshold current value Ith defined by the processing unit 120 (step S14), the processing unit 120 determines that the sled motor continuously rotates, and the step S14 is repeatedly done. Whereas, if the driving current Ia is greater than the threshold current value Ith defined by the processing unit 120 (step S14), the processing unit 120 confirms that the move-sled-home action is finished (step S16).

Figure 6A:
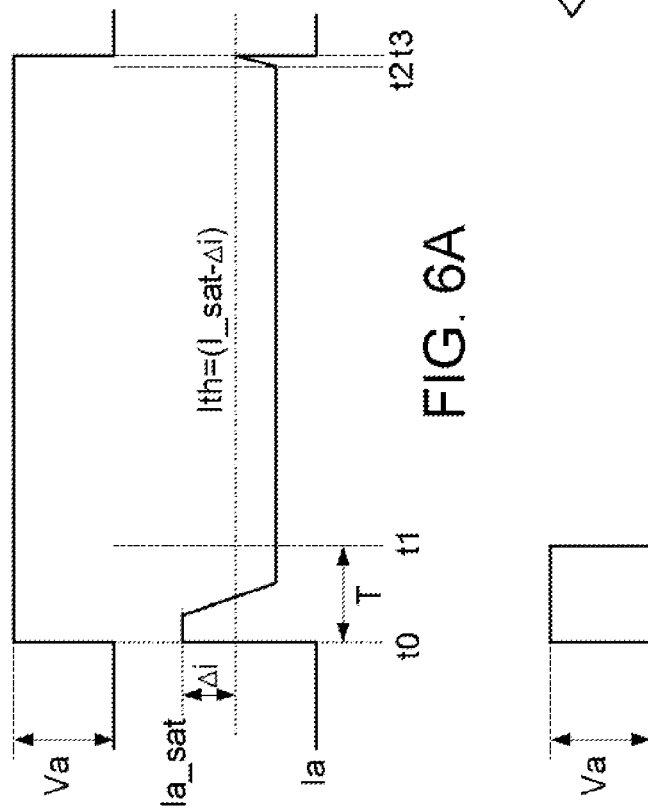
FIGS. 6A and 6B are schematic timing waveform diagrams illustrating associated signals processed by the move-sled-home device according to the first embodiment of the present invention.
Figure 6B:
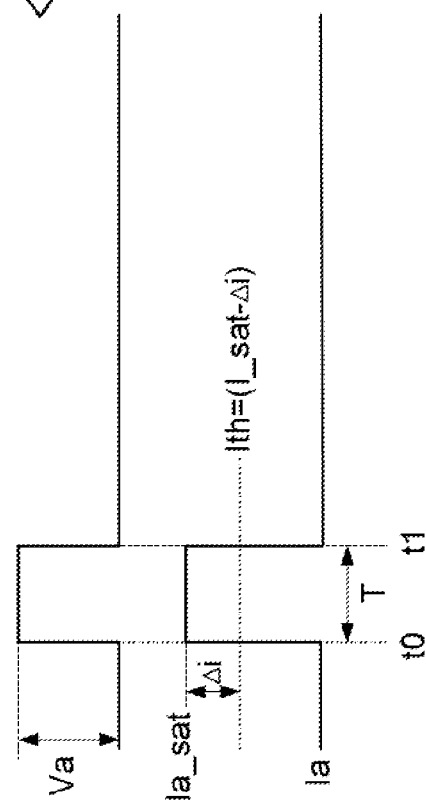

FIGS. 6A and 6B are schematic timing waveform diagrams illustrating associated signals processed by the move-sled-home device according to the first embodiment of the present invention. During the specified time interval T, the processing unit 120 obtains the threshold current value Ith by subtracting an offset value ($\Delta i$) from the saturated driving current Ia_sat. Since the optical disc drive fails to realize the actual position of the sled before the move-sled-home action starts, the possible situations include that the sled is deviated from the innermost track of the optical disc (see FIG. 6A) or located above the innermost track of the optical disc (see FIG. 6B).

Please refer to FIG. 6A. At the time spot t0, the optical disc drive starts the move-sled-home action, and thus a driving voltage Va is outputted from the motor actuator 130. Although the driving voltage Va is received by the sled motor M1 at the time spot t0, the sled motor M1 does not instantly rotate because of the inherent static friction force of the sled motor M1. Meanwhile, the driving current Ia is equal to the saturated driving current Ia_sat. During the specified time interval T, the saturated driving current Ia_sat is realized by the processing unit 120 according to the indicating signal outputted from the current-detecting unit 140. By subtracting the offset value ($\Delta i$) from the saturated driving current Ia_sat, the threshold current value Ith is obtained.

After the static friction force of the sled motor M1 is overcome, the sled motor M1 starts to rotate, and thus the sled is moved toward the innermost track of the optical disc. Meanwhile, the driving current Ia gradually decreases. In accordance with the present invention, a specified time interval T is defined by the processing unit 120. After the specified time interval T (i.e. at the time spot t1), the current-detecting unit 140 starts to detect the driving current Ia.

From the time spot t1 to the time spot t2, the sled motor M1 continuously rotates. In this situation, the magnitude of the driving current Ia is smaller than the threshold current value Ith.

At the time spot t2, the sled is in contact with the spindle motor. As such, the sled is stopped, and the sled motor M1 fails to rotate. Meanwhile, the driving current Ia abruptly rises. At the time spot t3, the driving current Ia rises to the threshold current value Ith. In this situation, the processing unit 120 confirms that the move-sled-home action is finished, so that the processing unit 120 stops generating the control signal. Meanwhile, the driving voltage Va and the driving current Ia reach zero.

Please refer to FIG. 6B. At the time spot t0, the optical disc drive starts the move-sled-home action, and thus a driving voltage Va is outputted from the motor actuator 130. In addition, at the time spot t0, the sled is located above the innermost track of the optical disc and in contact with the spindle motor. Although the driving voltage Va is received by the sled motor M1 at the time spot t0, the sled motor M1 does not rotate because the sled cannot move toward the spindle motor further. Meanwhile, the driving current Ia is equal to the saturated driving current Ia_sat.

After the specified time interval T (i.e. at the time spot t1), the processing unit 120 detects that the driving current Ia of the sled motor M1 is still greater than the threshold current value Ith. In this situation, the processing unit 120 confirms that the move-sled-home action is finished, so that the processing unit 120 stops generating the control signal. Meanwhile, the driving voltage Va and the driving current Ia reach zero.

Figure 7:
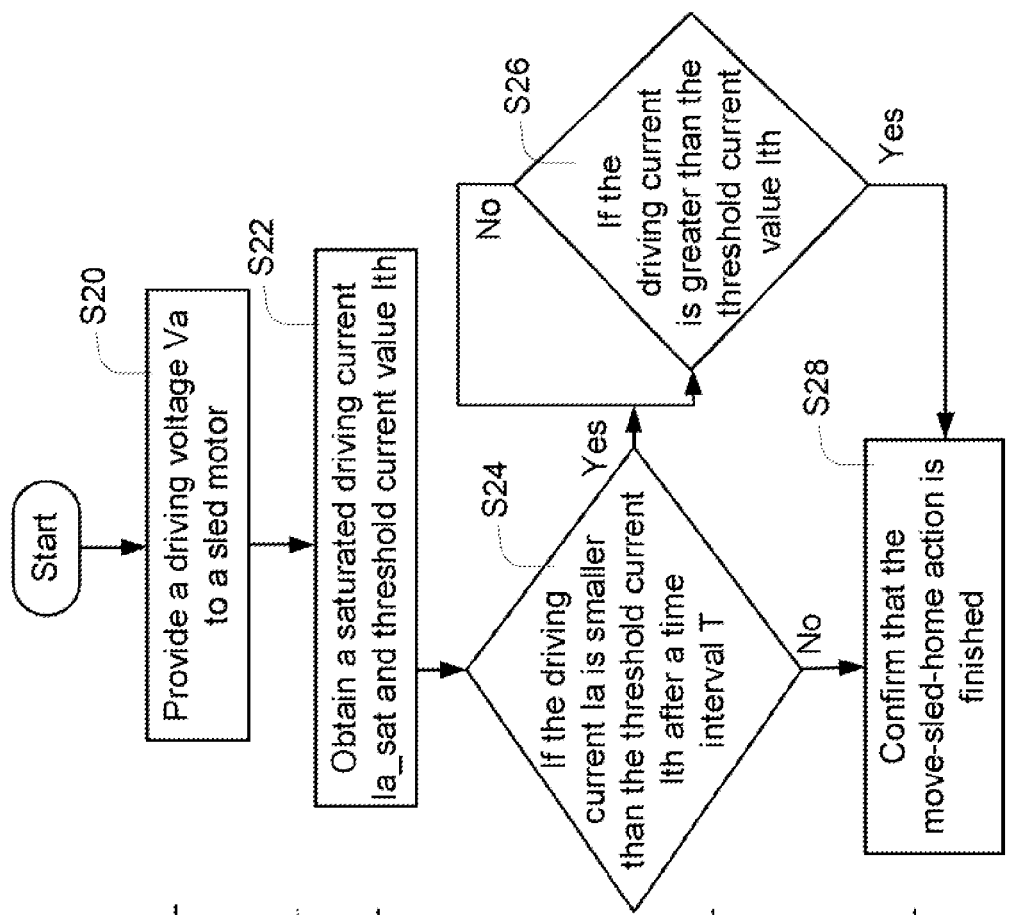
FIG. 7 is a flowchart illustrating a move-sled-home method for moving a sled to a sled-home position as described in FIGS. 6A and 6B.

FIG. 7 is a flowchart illustrating a move-sled-home method for moving a sled to a sled-home position as described in FIGS. 6A and 6B. First of all, in the step S20, the optical disc drive starts the move-sled-home action, and thus the processing unit 120 outputs a control signal to the motor actuator 130. According to the control signal, a driving voltage Va is outputted from the motor actuator 130.

During the specified time interval T, the saturated driving current Ia_sat of the sled motor M1 is realized by the processing unit 120 according to the indicating signal outputted from the current-detecting unit 140. By subtracting the offset value (Δi) from the saturated driving current Ia_sat, the threshold current value Ith is obtained (step S22).

After the specified time interval T, the driving current Ia of the sled motor M1 is realized by the processing unit 120 according to the indicating signal outputted from the current-detecting unit 140.

If the driving current Ia is greater than the threshold current value Ith (step S24), the processing unit 120 confirms that the move-sled-home action is finished (step S28). Whereas, if the driving current Ia is smaller than the threshold current value Ith (step S24), the processing unit 120 confirms that the sled motor continuously rotates, and the processing unit 120 continuously detects the driving current Ia.

If the driving current Ia is continuously smaller than or equal to the threshold current value Ith (step S26), the processing unit 120 confirms that the sled motor continuously rotates, and the step S26 is repeatedly done. Whereas, if driving current Ia is greater than the threshold current value Ith (step S26), the processing unit 120 confirms that the move-sled-home action is finished (step S28).

Moreover, before the move-sled-home action is executed, the optical disc drive should execute a process of stopping the spindle motor. Since the spindle motor is also a DC motor, the concept of the present invention can be also applied to the process of stopping the spindle motor.

Figure 8:
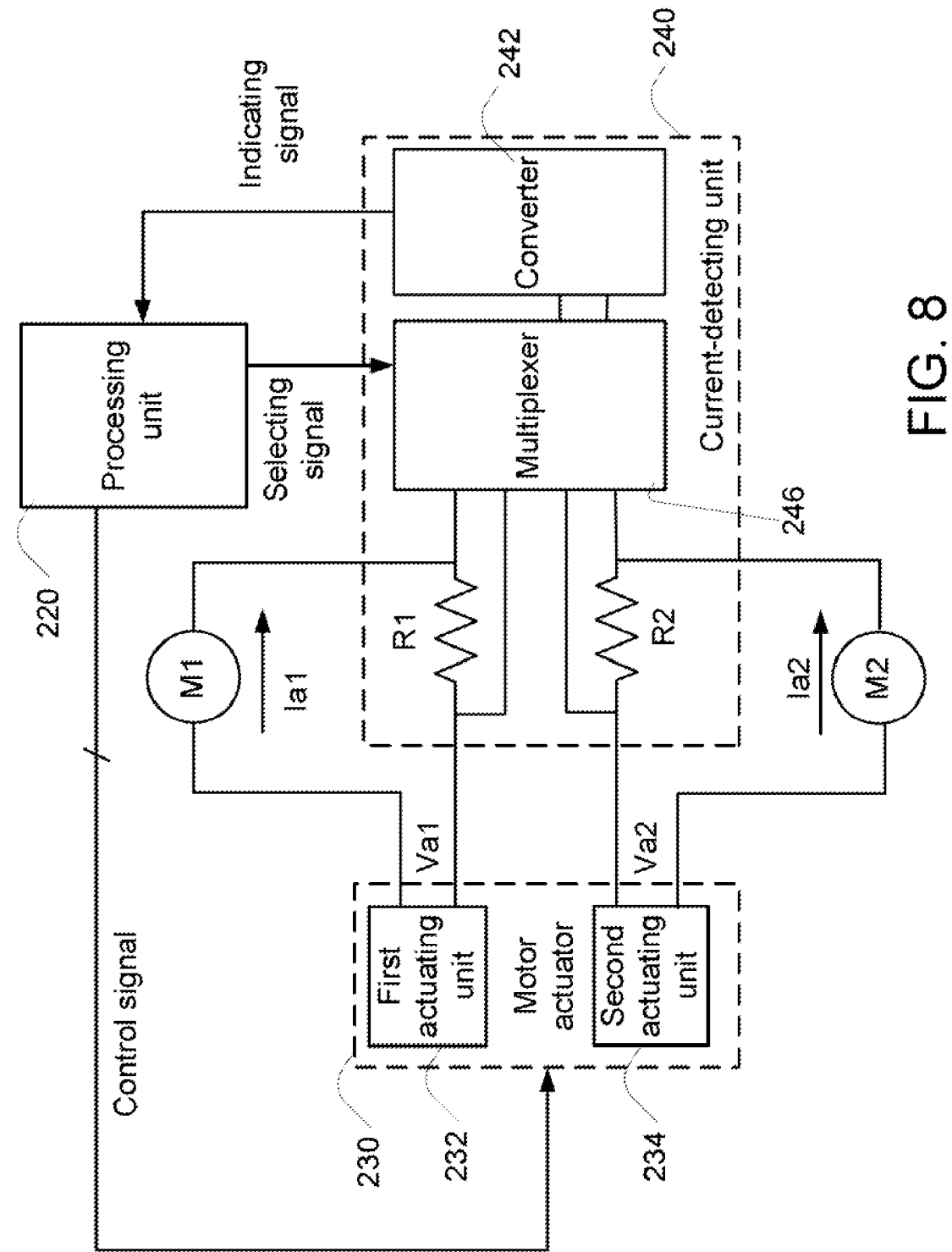
FIG. 8 is a schematic functional block diagram illustrating a move-sled-home device for moving a sled to a sled-home position according to a second embodiment of the present invention.

FIG. 8 is a schematic functional block diagram illustrating a move-sled-home device for moving a sled to a sled-home position according to a second embodiment of the present invention. As shown in FIG. 8, the move-sled-home device comprises a processing unit 220, a motor actuator 230, a sled motor M1, a spindle motor M2 and a current-detecting unit 240. The current-detecting unit 240 comprises a first detecting resistor R1, a second detecting resistor R2, a multiplexer 246 and a converter 242. The motor actuator 230 comprises a first actuating unit 232 and a second actuating unit 234. An example of the processing unit 220 is a digital signal processor (DSP). In this embodiment, the converter 242 is an analog-to-digital converter (ADC).

Hereinafter, the operating principles of the move-sled-home device will be illustrated with reference to FIG. 8. For executing the move-sled-home action, the processing unit 220 outputs a control signal to the motor actuator 230. According to the control signal, the first actuating unit 232 outputs a first driving voltage Va1. According to the first driving voltage Va1, the sled motor M1 rotates to move a sled along a guiding rail (not shown). Moreover, according to the control signal, the second actuating unit 234 outputs a second driving voltage Va2. According to the second driving voltage Va2, the spindle motor M2 rotates to drive an optical disc (not shown). Moreover, a selecting signal is transmitted from the processing unit 220 to the multiplexer 246 of the current-detecting unit 240. According to the selecting signal, a first analog detecting voltage detected across the first detecting resistor R1 or a second analog detecting voltage detected across the second detecting resistor R2 is selected to be transmitted to the converter 242. Moreover, the indicating signal outputted from the converter 242 indicates a first driving current Ia1 of the sled motor M1 or a second driving current Ia2 of the spindle motor M2.

For executing the process of stopping the spindle motor M2 by the optical disc drive, the second analog detecting voltage across the second detecting resistor R2 is selected to be outputted from the multiplexer 246 to the converter 242 according to the selecting signal. In this situation, the indicating signal outputted from the converter 242 indicates the second driving current Ia2 of the spindle motor M2. Once the second driving current Ia2 of the spindle motor M2 is zero, the processing unit 220 confirms that the spindle motor M2 stops rotating.

Next, the processing unit 220 starts to execute the move-sled-home action. During the move-sled-home action, the multiplexer 246 selects to output the first analog detecting voltage across the first detecting resistor R1 to the converter 242 according to the selecting signal. In addition, the processing unit 220 outputs a control signal to the first actuating unit 232 of the motor actuator 230. According to the control signal, the first actuating unit 232 outputs a first driving voltage Va1. According to the first driving voltage Va1, the sled motor M1 generates a first driving current Ia1. As such, the sled motor M1 rotates to move a sled (not shown). Moreover, according to the first driving current Ia1, a first analog detecting voltage across the detecting resistor R1 of the current-detecting unit 240 is transmitted to the converter 242. By the converter 242, the first analog detecting voltage is converted into a digital indicating signal, which is transmitted to the processing unit 220. By following the flowchart of FIG. 5 or FIG. 7, the processing unit 220 will determine whether the move-sled-home action is finished.

As can be seen from the second embodiment, since only a single current-detecting unit is employed to detect the operating statuses of the sled motor and the spindle motor, the method and device of the present invention are more cost-effective.

From the above description, the present invention provides a move-sled-home device and a move-sled-home method for use in an optical disc drive without any limit switch. The driving current of the sled motor is detected to determine whether a move-sled-home action is finished, and the sled motor stops rotating immediately after the move-sled-home action is finished. Compared with the prior arts, the movesled-home method is time-saving. In addition, the problem of damaging the spiral guiding rod or the sled is minimized.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A move-sled-home device for use in an optical disc drive, the move-sled-home device comprising:
   a processing unit for outputting a control signal;
   a motor actuator for generating a driving voltage according to the control signal;
   a sled;
   a sled motor for generating a driving current according to the driving voltage to move the sled; and
   a current-detecting unit for receiving the driving current, converting the driving current into an indicating signal, and outputting the indicating signal to the processing unit,
   wherein during a move-sled-home action, the processing unit realizes a magnitude of the driving current according to the indicating signal, thereby determining whether the move-sled-home action is finished,
   wherein if the driving current is greater than a threshold current value after the move-sled-home action has been executed for a specified time interval, the move-sled-home action is finished, and if the driving current is smaller than the threshold current value after the move-sled-home action has been executed for the specified time interval, the move-sled-home action is not finished.

2. The move-sled-home device according to claim 1 wherein after the move-sled-home action is started and before the sled motor rotates, the driving current is equal to a saturated driving current, and the threshold current value is obtained by subtracting an offset value from the saturated driving current.

3. The move-sled-home device according to claim 1 wherein if the driving current is greater than the threshold current value after the move-sled-home action has been executed for the specified time interval, the processing unit confirms that the move-sled-home action is finished and the processing unit stops generating the control signal.

4. The move-sled-home device according to claim 1 wherein the current-detecting unit comprises:
   a detecting resistor for receiving the driving current; and
   a converter for receiving and converting an analog detecting voltage detected across the detecting resistor into the indicating signal.

5. The move-sled-home device according to claim 4 wherein the processing unit is a digital signal processor, and the converter is an analog-to-digital converter.

6. A move-sled-home device for use in an optical disc drive, the move-sled-home device comprising:
   a processing unit for outputting a control signal and a selecting signal;
   a first actuating unit for generating a first driving voltage according to the control signal;
   a second actuating unit for generating a second driving voltage according to the control signal;
   a sled;
   a sled motor for generating a sled motor driving current according to the first driving voltage to move the sled;
   a spindle motor for generating a spindle motor driving current according to the second driving voltage; and
   a current-detecting unit for selecting the sled motor driving current or the spindle motor driving current to be converted into an indicating signal according to the selecting signal, and outputting the indicating signal to the processing unit,
   wherein during a move-sled-home action, the processing unit realizes a magnitude of the sled motor driving current according to the indicating signal, thereby determining whether the move-sled-home action is finished,
   wherein if the driving current is greater than a threshold current value after the move-sled-home action has been executed for a specified time interval, the move-sled-home action is finished, and if the driving current is smaller than the threshold current value after the move-sled-home action has been executed for the specified time interval, the move-sled-home action is not finished,
   wherein during a spindle motor stopping process, the processing unit realizes a magnitude of the spindle motor driving current according to the indicating signal, thereby determining whether the spindle motor stopping process is finished.

7. The move-sled-home device according to claim 6 wherein after the move-sled-home action is started and before the sled motor rotates, the driving current is equal to a saturated driving current, and the threshold current value is obtained by subtracting an offset value from the saturated driving current.

8. The move-sled-home device according to claim 6 wherein after the move-sled-home action has been executed for the specified time interval, if the sled motor driving current is greater than the threshold current value, the processing unit confirms that the move-sled-home action is finished and the processing unit stops generating the control signal.

9. The move-sled-home device according to claim 6 wherein the current-detecting unit comprises:
   a first detecting resistor for receiving the sled motor driving current;
   a second detecting resistor for receiving the spindle motor driving current;
   a multiplexer for selecting and outputting one of a first analog detecting voltage detected across the first detecting resistor and a second analog detecting voltage detected across the second detecting resistor; and
   a converter for receiving and converting the selected one of the first analog detecting voltage and the second analog detecting voltage into the indicating signal.

10. The move-sled-home device according to claim 9 wherein the processing unit is a digital signal processor, and the converter is an analog-to-digital converter.

11. The move-sled-home device according to claim 6 wherein the processing unit confirms that the spindle motor stops rotating if the spindle motor driving current is zero.

12. A move-sled-home method for use in an optical disc drive, the move-sled-home method comprising steps of:
   providing a driving voltage to a sled motor, so that the sled motor generates a driving current to move a sled;
   executing a move-sled-home action for moving the sled to a sled-home position; and
   determining whether the move-sled-home action is finished,
   wherein if the driving current is greater than a threshold current value after the move-sled-home action has been executed for a specified time interval, it is confirmed that the move-sled-home action is finished, wherein if the driving current is smaller than the threshold current value after the move-sled-home action has been executed for the specified time interval, the move-sled-home action is not finished.

13. The move-sled-home method according to claim 12 wherein after the move-sled-home action is started and before the sled motor rotates, the driving current is equal to a saturated driving current, and the threshold current value is obtained by subtracting an offset value from the saturated driving current.

14. The move-sled-home method according to claim 12 wherein before the driving voltage is provided to the sled motor, the move-sled-home method further comprises a step of stopping a spindle motor.

15. The move-sled-home method according to claim 12, further comprising a step of stopping providing the driving voltage.

* * * * *